United States Patent
Martin

(10) Patent No.: US 9,876,731 B2
(45) Date of Patent: Jan. 23, 2018

(54) ON DEMAND PROVISIONING OF APPLICATIONS

(71) Applicant: AOD CORPORATION, Montréal (CA)

(72) Inventor: Luc Martin, Québec (CA)

(73) Assignee: AOD Corporation, Montreal (CA)

( * ) Notice: Subject to any disclaimer, the term of this patent is extended or adjusted under 35 U.S.C. 154(b) by 0 days.

(21) Appl. No.: 15/274,271

(22) Filed: Sep. 23, 2016

(65) Prior Publication Data

US 2017/0012893 A1  Jan. 12, 2017

Related U.S. Application Data

(63) Continuation of application No. 15/188,416, filed on Jun. 21, 2016, which is a continuation of application
(Continued)

(30) Foreign Application Priority Data

Jan. 27, 2004 (CA) .................................... 2456799
Apr. 1, 2004 (CA) .................................... 2463006

(51) Int. Cl.
*G06F 15/16* (2006.01)
*H04L 12/911* (2013.01)
(Continued)

(52) U.S. Cl.
CPC ............... *H04L 47/70* (2013.01); *G06F 8/61* (2013.01); *G06Q 30/06* (2013.01);
(Continued)

(58) Field of Classification Search
CPC ....... G06F 8/61; G06Q 30/06; H04L 41/0806; H04L 47/70; H04L 67/02; H04L 67/10; H04L 67/32; H04L 67/34; H04L 67/42
(Continued)

(56) References Cited

U.S. PATENT DOCUMENTS 6,151,643 A  11/2000  Cheng et al.
6,574,618 B2  6/2003  Eylon et al.
(Continued)

FOREIGN PATENT DOCUMENTS

EP  1376745 A1  1/2004
GB  2365169 A  2/2002
WO  02080598 A1  10/2002

OTHER PUBLICATIONS

International Preliminary Report on Patentability for Application No. PCT/CA2005/000094, dated Jul. 27, 2006, 7 pages.
(Continued)

*Primary Examiner* — Phuoc Nguyen
(74) *Attorney, Agent, or Firm* — Jason Mueller-Neuhaus; Borden Ladner Gervais LLP

(57) ABSTRACT

A system and method for on demand provisioning of applications to clients, the system providing on demand access to applications by clients and their users over a computer communication system such as the Internet, thereby eliminating the need for clients to independently purchase, install, integrate and maintain the applications on their own systems. The system and method designed to create and install a separate, stand alone, dedicated copy or instance of the applications for each new client and to provide the clients with on demand access to provisioning and management functions allowing the clients to purchase, manage and maintain the applications on demand.

22 Claims, 3 Drawing Sheets

Related U.S. Application Data

No. 12/653,089, filed on Dec. 8, 2009, now abandoned, which is a continuation of application No. 10/587,405, filed as application No. PCT/CA2005/000094 on Jan. 27, 2005, now abandoned.

(51) Int. Cl.

| | | |
|---|---|---|
| *G06F 9/445* | (2006.01) | |
| *G06Q 30/06* | (2012.01) | |
| *H04L 12/24* | (2006.01) | |
| *H04L 29/08* | (2006.01) | |
| *H04L 29/06* | (2006.01) | |

(52) U.S. Cl.
CPC .......... *H04L 41/0806* (2013.01); *H04L 67/10* (2013.01); *H04L 67/32* (2013.01); *H04L 67/34* (2013.01); *H04L 67/42* (2013.01); *H04L 67/02* (2013.01)

(58) Field of Classification Search
USPC .................................. 709/203, 229, 232, 238
See application file for complete search history.

(56) References Cited

U.S. PATENT DOCUMENTS

| | | | | |
|---|---|---|---|---|
| 6,816,882 B1* | 11/2004 | Conner | ................ | G06F 21/121 |
| | | | | 709/203 |
| 7,222,152 B1 | 5/2007 | Thompson et al. | | |
| 7,330,717 B2* | 2/2008 | Gidron | ................ | G06Q 30/04 |
| | | | | 455/405 |
| 2002/0142760 A1* | 10/2002 | Gidron | ..................... | G06F 8/67 |
| | | | | 455/414.1 |
| 2002/0166117 A1* | 11/2002 | Abrams | ............... | G06Q 20/145 |
| | | | | 717/177 |
| 2003/0028642 A1 | 2/2003 | Agarwal et al. | | |
| 2003/0154239 A1* | 8/2003 | Davis | ................. | H04L 63/0227 |
| | | | | 709/201 |
| 2004/0064470 A1 | 4/2004 | Raue | | |
| 2004/0107125 A1 | 6/2004 | Guheen et al. | | |
| 2004/0111709 A1* | 6/2004 | Furst | ................... | G06Q 10/0875 |
| | | | | 717/131 |
| 2004/0139105 A1* | 7/2004 | Trepess | ............. | G06F 17/30696 |
| 2005/0021818 A1* | 1/2005 | Singhal | ................... | H04L 67/20 |
| | | | | 709/232 |
| 2005/0125509 A1* | 6/2005 | Ramachandran | ......... | G06F 8/61 |
| | | | | 709/220 |
| 2005/0188345 A1* | 8/2005 | Chang | ...................... | G06F 8/20 |
| | | | | 717/101 |
| 2005/0216381 A1* | 9/2005 | Banatwala | ............. | G06Q 10/10 |
| | | | | 705/34 |

OTHER PUBLICATIONS

International Search Report and Written Opinion for Application No. PCT/CA2005/000094, dated Jun. 9, 2005, 8 pages.

U.S. Appl. No. 10/587,405, Office Action dated Jun. 8, 2009, 10 pages.

U.S. Appl. No. 12/653,089, Office Action dated Sep. 30, 2010, 11 pages.

U.S. Appl. No. 12/653,089, Office Action dated Nov. 21, 2012, 14 pages.

\* cited by examiner

Traditional Approach

Traditional Service Provider Approach

ON DEMAND PROVISIONING OF APPLICATIONS

CROSS REFERENCE TO RELATED APPLICATIONS

The present application is a Continuation of application Ser. No. 15/188,416 filed Jun. 21, 2016, which is a Continuation of application Ser. No. 12/653,089 filed Dec. 8, 2009, which is a Continuation of application Ser. No. 10/587,405 filed under 371(c) on Jul. 15, 2008, which is the U.S. national stage application of International Application No. PCT/CA2005/000094 filed Jan. 27, 2005, which was published Aug. 4, 2005 as International Publication WO 2005/071886. The International Application claims priority on Canadian Application No. 2,456,799 filed Jan. 27, 2004 and Canadian Application 2,463,006 filed Apr. 1, 2004.

FIELD

The present invention generally relates to on demand provisioning of computer software applications to clients, and in particular relates to a system and a method for hosting such applications and providing demand, access to those applications by clients and their users, thereby eliminating the need for clients to independently purchase, install, integrate and maintain the applications on their own systems.

BACKGROUND

In the present description, an end user is the person that uses an application's functionality, while a client is the entity responsible for purchasing, installing, integrating and maintaining the application. Clients are customers of the application developer or distributor, while end users are employees or guests of the clients. In general, users can be divided into two groups, end users, who use the application's functionality, and master users, or super users, who act on behalf of the client to purchase, install, integrate and maintain the application. A master user is equivalent to the system administrator within the client computing environment. In some instances, the master user and the end user may be one and the same.

A client's interaction with an application can generally be divided into two distinct categories, first, acquiring the application, and second, making the application's functionality available to its users.

When combined, these two steps refer to all the activities necessary to make the application run, including purchasing the application, and installing, integrating, testing, securing, optimizing, managing, upgrading, customizing, troubleshooting, and monitoring the application over its life cycle. Resources are required from both the application developer or distributor and the client. The application developer or distributor furnishes support and consulting, while the client provides information technology ("IT") resources. The client is responsible for the hardware requirements, network bandwidth, storage and the associated support for its users. The process repeats when new versions or upgrades of the application are released. A fill 70% to 90% of the client's IT budget is spent acquiring, deploying, integrating and maintaining applications.

FIG. 1 shows an example of the traditional "shrink wrap" approach to providing an application's functionality to users 26. In this traditional approach, a single tenant server-based application is installed as a single application "instance" 20 within a client computing environment 22. A server-based application refers to an application that is managed at the server level and accessed remotely by users 26. Examples of server-based applications include: 1) Web applications developed using web technologies such as Java™ 2 Platform, Enterprise Edition (J2EE), Microsoft's .NET™, Web Services and HyperText Markup Language (HTML); 2) Desktop client server applications or desktop personal productivity applications deployed using thin client technologies such as Microsoft™ Windows™ Terminal Server or CITRIX™ ICA; and 3) Applications streamed to each user 26 on request using an application such as AppStream™, as described in U.S. Pat. No. 6,574,618, issued on Jun. 3, 2003. In this traditional approach, applications must be purchased, installed, integrated, tested and maintained by the client. Some support and consulting may be offered by the application developer or distributor, but it is the client who is responsible for ensuring access to the application's functionality by its users 26. The disadvantage of this traditional approach is that each time new software is needed or application upgrades made available, the whole process must be repeated, which can eat up a lot of client resources. Moreover, the development and maintenance of IT infrastructure, including software applications, is not generally the core expertise of the client.

Of course, the ultimate goal of all clients is to provide the application's functionality to the client's users and guests. Therefore, it would be advantageous if a system could be provided that reduced or eliminated the complexity and cost associated with the acquisition, deployment and maintenance of computer applications, so as to provide the client and its users with the easiest and most expeditious possible access to the application's functionality at the lowest possible cost. Such a system would allow clients and their corresponding users to extract the application's functionality "on demand", without having to deal with all the other tasks required to deploy, integrate and maintain the application.

Provisioning of applications "on demand" refers to providing applications to clients of the application developer or distributor, enabling them to deliver the application's functionality to the user. It is the client that has to deal with all the technical issues associated with the delivery and usage of the application's functionality by the users, such as purchasing, deploying, maintaining, managing and upgrading. Provisioning of applications "on-demand" refers to replacing the current "shrink-wrap" deployment of existing applications with a system that performs all the functions necessary for providing and readying the application for use by the user.

The traditional application service provider ("ASP") approach to solving this problem is shown in FIG. 2. In this approach, single tenant server-based applications are installed as application instances 20 and maintained in a service provider computing environment 52. Access by users 26 to the applications' functionality is provided online, through a computer communication system 40 by way of an application universal resource identifier ("URI"). Computer communication system 40, may be any data network, such as the Internet, an intranet, extranet or other TCP/IP based communication network, or other types of data networks, including wireless data networks.

One advantage of this solution is that applications need no longer be installed and maintained by the client in the client computing environment. Instead, they are installed and maintained in the service provider computing environment 52, thus saving the client considerable time and IT resources.

One problem with this traditional ASP approach is that for it to function properly, each new client requires a separate installation or "instance" 20 of the application to be installed within the service provider computing environment 52, however, there is no mechanism in place to create and manage this new installation, it must be done manually for each new client. Also, in this traditional approach there is no convenient means for the client to purchase, configure or manage the applications except through traditional methods such as contacting the service provider by telephone or email. In the traditional service provider approach, the applications are not "on demand". This results in higher costs for providing and managing applications since all provisioning and management functions must be performed manually. The time required to deploy applications is also increased. Moreover, due to the multiple points of contact between the client and the ASP, and the complex nature of the interaction, there is a significant opportunity for human error, which produces less consistent and less reliable results.

One existing approach to solving the problem is shown in FIG. 3. In this solution, the ASP provides a sever-based application installed as an instance 20 in a service provider computing environment 52. As before, access by users 26 to the application's functionality is provided online through a computer communication system 40 by way of an application URI. One advantage of this system is that clients also gain online, on demand access, through the computer communication system 40, to provisioning and management functions, thereby permitting clients to make online purchase requests and to configure and manage the application. One problem with this approach is that for the application to be usable by multiple clients, each having multiple users 26, the application must be developed from the ground up with a "multi-tenant" approach in mind, or existing single-tenant applications must be customized, a costly, time consuming and risky process. Therefore, the system cannot be used for on demand provisioning of most existing off-the-shelf applications to clients. Although each client and its users 26 appear to get access to a customized version of the application, in reality, they are all accessing the same application instance 20, with only the client's personal data being stored separately. No separate application instance 20 is created and installed for each client. Typically, only a single multi-tenant application is offered through a web portal dedicated to provisioning and managing that application's functionality. Functionalities of the application are closely coupled to the provisioning and management functions of the web portal, which makes the application more difficult to develop, manage and maintain. The system is not easily adapted to offering multiple applications through the same web portal.

SUMMARY

In view of the foregoing, there is a need, to provide a system and method for on demand, provisioning of software applications to clients based on a system of application provisioning that creates a new installed instance of an application for each new client and provides the client with a convenient "self service" means to rent or subscribe to, configure and manage the application over time.

According to one aspect of the present system, there is provided, a system for on demand, provisioning of at least one application to at least one client, the system comprising an online provisioning and management system configured for communication with the at least one client over a computer communication system, the online provisioning and management system configured to create an application instance of the at least one application in response to a rental request from the at least one client over the communication system, the application instance being a separate, stand-alone installation of the at least one application, the application instance being dedicated to the at least one client, the online provisioning and management system configured to allow access to the application instance by users of the at least one client over the computer communication system, thereby permitting the users to use the application instance, the online provisioning and management system configured to provide the at least one client with access to provisioning and management functions over the computer communication system for allowing the at least one client to rent, manage and maintain the application instance on demand.

According to another aspect, there is provided a method for on demand provisioning of at least one application to at least one client, the method comprising the steps of: providing an online provisioning and management system configured for communication with the at least one client over a computer communication system and for providing provisioning and management functions; receiving a rental request for the at least one application from the at least one client over the computer communication system; causing the online provisioning and management system to create an application instance of the at least one application in response to the rental request, the application instance being a separate, stand-alone installation of the at least one application, the application instance being dedicated to the at least one client; allowing access to the application instance by users of the at least one client over the computer communication system, thereby permitting the users to use the application instance; and allowing access by the at least one client to the provisioning and management functions over the computer communication system, the provisioning and management function comprising features to allow the at least one client to rent, manage, and maintain the application instance on demand.

One advantage of the applicant's system and method for on demand provisioning of applications over the existing on demand approach (see FIG. 3) is that, in one aspect, the applicant's system works with existing off-the-shelf, server-based software applications that have been developed with a single tenant approach. Such applications do not have to be modified or customized to work with the applicant's system. Another advantage of a further aspect of the applicant's system is that multiple applications can be offered through the same web portal, since there is no need to integrate the application's functionality with the provisioning and management functions.

One advantage of one aspect of the applicant's system and method as described herein over the traditional ASP approach (see FIG. 2), is that the complexities of delivering applications as a service are hidden through the application of technology automation, since the applicant's system replaces all steps required in the delivery and management of applications which are currently performed manually.

BRIEF DESCRIPTION OF THE DRAWINGS

The applicant's on demand provisioning of applications will be further understood from the following description of preferred embodiments with reference to the drawings in which.

DETAILED DESCRIPTION

Figure 1:
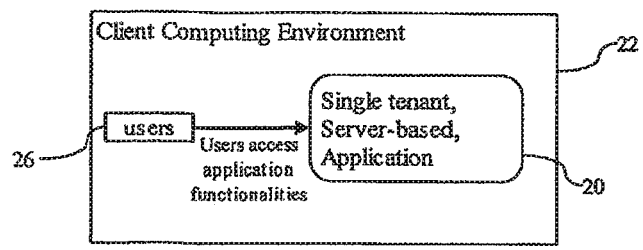
FIG. 1 is a schematic diagram showing the existing traditional "shrink wrap" approach to providing server-based software applications in a client computing environment.
Figure 2:
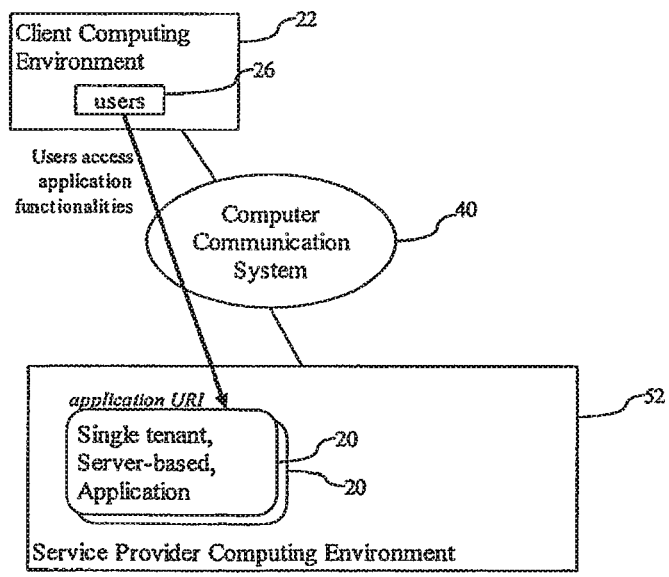
FIG. 2 is a schematic diagram showing the traditional application service provider approach to providing applications to clients in a service provider computing environment over an online computer communication system.
Figure 3:
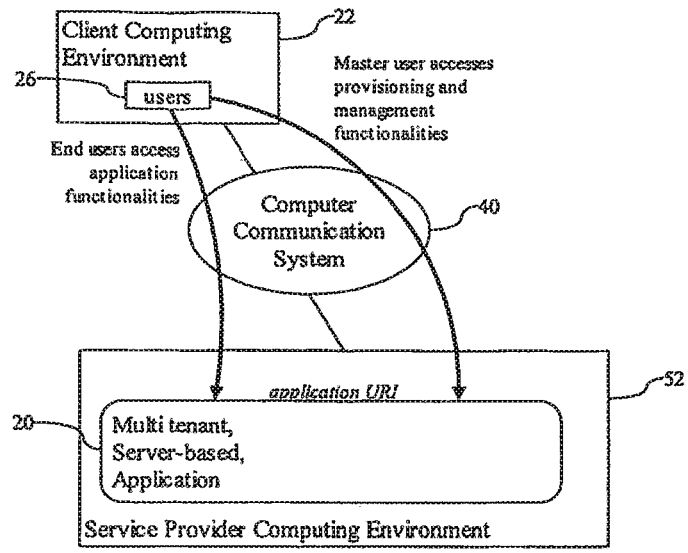
FIG. 3 is a schematic diagram showing one existing approach to on demand provisioning of software applications to clients in a service provider computing environment over an online computer communication system.
Figure 4:
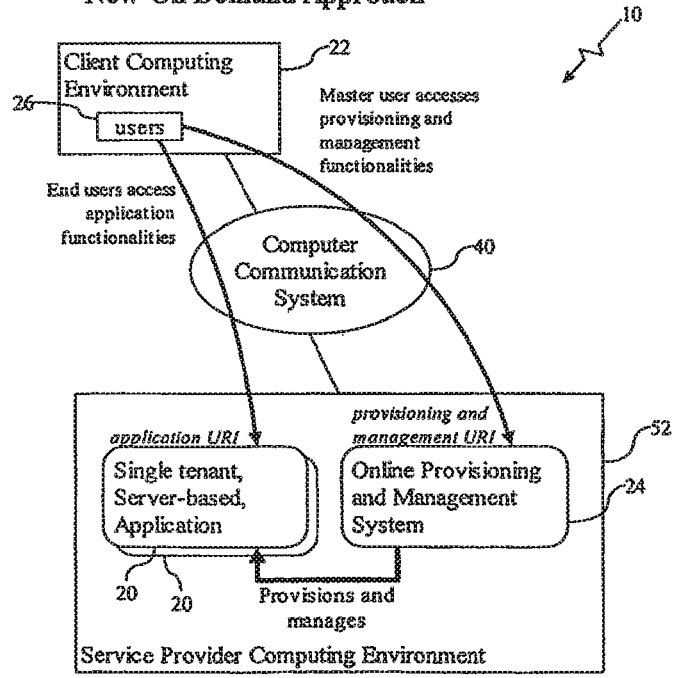
FIG. 4 is a schematic diagram of the applicant's system for on demand provisioning of applications to clients in a service provider computing environment over an online computer communication system.

Referring to FIG. 4, a system 10 for on demand provisioning of software applications to clients is shown in schematic form, including an online provisioning and management system 24 for maintaining, provisioning and managing applications and application instances 20 in a service provider computing environment 52. Online provisioning and management system 24 also provides an online interface with clients (represented by "master users") and end users 26 operating in a client computing environment 22, via an online computer communication system 40, such as the Internet, an intranet, extranet or other TCP/IP based communication network, or other types of data networks, including wireless data networks. This online interface provides end users 26 access to functionalities of application instances 20 and gives clients access to provisioning and management functions offered by online provisioning and management system 24. Provisioning and management functions of online provisioning and management system 24 relate to all the features necessary to allow clients to purchase, manage, and maintain application instances 20, on demand.

The service provider computing environment 52 can be operated by any entity, such as telecommunication companies, hosting companies, application service providers, system integrators and outsourcers, to name a few, wanting to provision applications on demand to clients. In a closed enterprise environment, service provider computing environment 52 may be operated by a company wanting to provision applications to its departments and branches (clients) for use by its employees (users).

The online provisioning and management system 24 is installed in service provider computing environment 52 and maintains and manages all applications and application instances 20, making them available for use by clients and their corresponding users 26. In general, the applications can be any existing, off-the-shelf, server-based software applications that have been developed with a single tenant approach, and need not have been developed from the ground up with the intent of being provisioned "on demand" or being used in a multi-tenant environment. In FIG. 4, application instances 20 are shown to be located in the service provider computing environment 52, which may be comprised of local and remote servers, provided there is maintained a suitable connection between the servers and the online provisioning and management system 24.

Clients access client provisioning and management functions offered by online provisioning and management system 24 online through the computer communication system 40 via a unique provisioning and management URI. Online provisioning and management system 24 can display to the client all available applications and all information related to the on demand provisioning and management of application instances 20. Online provisioning and management system 24 can be configured to set up client accounts containing all the client's personal information and to permit modification of that information by the clients. Online provisioning and management system 24 may support e-commerce transactions and may be customized and branded in accordance with each service provider computing environment 52 in which it is deployed.

Online provisioning and management system 24 receives and acts on client requests through computer communication system 40 and provides information and feedback to the client through the same system. Client requests may relate to any provisioning and management function provided by online provisioning and management system 24 and may include, but are not limited to application purchase and subscription requests, subscription modification request, live application demonstration requests, trial subscription requests, application access requests, configuration requests, modification requests, upgrade requests, subscription renewal requests, copy requests, backup requests, suspension requests, termination requests, requests for usage statistics, and security requests.

Upon receipt of a client application subscription request for an application, online provisioning and management system 24 creates and installs a separate application instance 20 of the desired application for use by the requesting client only. This may be accomplished automatically upon receipt of a request, or it may be initiated manually. Application instance 20 is a separate, stand-alone installation of the desired application that is stored and maintained in the service provider computing environment 52. Application instance 20 may be installed on a local or remote server, which is part of the service provider computing environment, provided there is maintained a suitable connection between the server and the online provisioning and management system 24. For example, the remote server could be a shared portion of the client computing environment 22. In all cases, application instance 20 is dedicated to the client and is made available for the exclusive use of the users 26 of the requesting client. The client is supplied with a unique application URI or path that can be distributed to end users 26, giving them immediate, direct and seamless access to application instance 20. If a second client requests a subscription to the same application, a second identical application instance 20 is created and installed by online provisioning and management system 24 for use by the users 26 of the second client. These steps are repeated for each subsequent client and each desired application.

Each application instance 20 is provided with client-modifiable features that can be configured by the requesting client via the online provisioning and management system 24. For example, application instance 20 may include security features that make it accessible only by the particular requesting client and its corresponding users 26. Application instance 20 may also include branding features that can be configured and modified by the client through the online provisioning and management system 24.

In addition to providing clients with the ability to purchase subscriptions to applications, on demand, the following provisioning and management functions are provided by online provisioning and management system 24 and are accessible through the computer communication system 40 by each potential client seeking to purchase subscriptions to application: (1) standard e-commerce features; (2) online live demonstrations of applications; and (3) online, time-limited trials of applications before the decision is made to subscribe.

Online provisioning and management system 24 may also monitor and control access to application instances 20 by clients and their corresponding users 26, and removes the application instances 20 when requested to do so by clients or when the subscription terms expire. The following additional provisioning and management functions are provided by online provisioning and management system 24 and are made available to clients through the online computer communication system 40, following the purchased of a subscription: (1) seamless access to the respective application instances 20 using unique application URIs or paths supplied to each client and generally made available by the clients to their corresponding users 26; (2) the ability to upgrade and/or renew subscription terms for the application instances 20; (3) the ability to save or restore backup copies of the application instances 20 to a local storage device to permit reconstruction of the application instances 20, if required; (4) the ability to set and change client configuration data associated with the application instances 20; (5) the ability to rename or change the path or URI used to access the application instances 20; (6) the ability to suspend or resume user 26 access to the application instances 20; (7) the ability to review resource consumption by the application instances 20, including usage of storage space, bandwidth and CPU time; (8) the ability to review accesses to the application instance 20 by users 26, including current users, named users, and number of hits, etc.; and (9) the ability to upgrade or downgrade application instances 20 to a newer or older code version, respectively. Except for user access to the application instances 20, these provisioning and management functions are normally accessible only through a provisioning and management URI by an authorized system administrator or "master user" of the client 22 who is given special status through a userid and/or password access system. The provisioning and management URI may be different from the application URI mentioned above.

Online provisioning and management system 24 may be configured to limit access to application instances 20, for example, to a maximum number of user hits or a maximum number of concurrent users 26.

As noted above, online provisioning and management system 24 provides for upgrading of applications and the subsequent upgrading of each corresponding application instance 20. Online provisioning and management system 24 may be configured to upgrade application instances 20 only on receipt of a specific upgrade request from the corresponding client.

As noted above, online provisioning and management system 24 may support e-commerce transaction processing through the computer communication system 40, can handle multiple requests from multiple clients, and can deploy multiple application instances 20 of multiple applications.

The applicant's herein-described system for on demand provisioning of applications to clients provides clients and their corresponding users 26 with seamless access to application, without the burden of intrusive infrastructure and software requirements, or the added IT expenses associated with manually deploying and maintaining the application instances 20 in a local client computing environment. Application instances 20 are installed copies of the requested applications, as modified by each client either at the time of purchase or at any time during the life cycle, as allowed and provided by the online provisioning and management system 24, and are stored and maintained in the service provider computing environment 52, and dedicated to each respective client.

Figure 5:
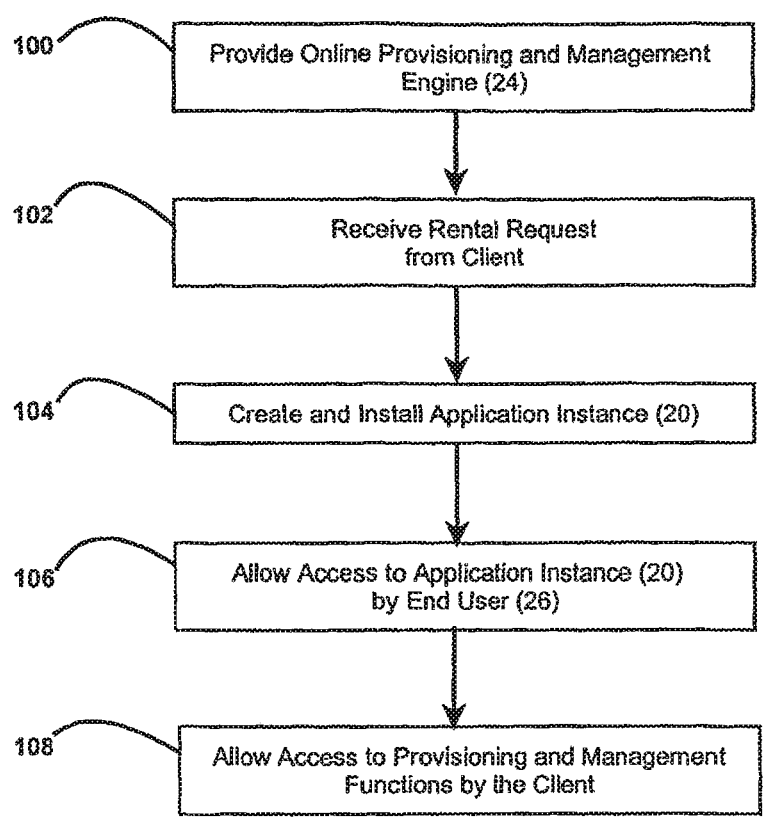
FIG. 5 is a flow chart showing the steps for one of the applicant's methods for on demand provisioning of applications to clients.

FIG. 5, is a flow chart showing the steps involved in one basic method of the applicant's on demand provisioning of applications. The method includes providing online provisioning and management system 24 (step 100) installed in service provider computing environment 52 and configured for communication with clients over computer communication system 40 and for allowing the clients access to provisioning and management functions provided of the online provisioning and management system 24, receiving a rental request for an application from a client (step 102), causing the online provisioning and management system 24 to create and install an application instance 20 of the desired application in response to the rental request (step 104), the application instance 20 being a separate, stand-alone, installation of the requested application, dedicated to the requesting client, allowing access to the installed application instance 20 by the client's users 26 (step 106), thereby permitting the client's users 26 to use application instance 20, and allowing access by the client (generally a "master-user" representing the client) to the provisioning and management functions of the online provisioning and management system 24 (step 108). As noted above, provisioning and management functions provided by online provisioning and management system 24 include features to allow the client to rent, manage and maintain the application instance 20.

All of the features of the applicant's above-described system and method for on demand, provisioning of applications to clients can be developed and implemented using existing standard technologies and programming languages, including existing web services, Extensible Markup Language (XML), Simple Object Access Protocol (SOAP), Hypertext Transfer Protocol (HTTP), relational databases, and application servers. Those skilled in the art, having reviewed and studied the applicant's above descriptions, will readily understand how to develop and implement the above-described system and method.

It will also be understood by those skilled in the art that the applicant's above described system and method is applicable to on demand, online provisioning of applications by service providers to clients and their users 26 in a commercial environment over a global computer communication network such as the Internet, or other network, and is equally applicable in an enterprise environment where a company's data center (equivalent to the application service provider) deploys applications to departments and branches (equivalent to clients) for use by individual employees (equivalent to users 26), over an internal, closed local area network environment or an extranet.

The above described system and method for on demand provisioning of applications to clients may be embodied in other specific forms without departing from the spirit or essential characteristics thereof. The present embodiments are therefore to be considered as illustrative and not restrictive, the scope of the applicant's system and method for on demand provisioning of applications to clients being indicated by the appended claims rather than by the foregoing description, and all changes that come within the meaning and range of equivalency of the claims are therefore intended to be embraced therein.

The invention claimed is:

1. An online provisioning and management system for on-demand provisioning of an application to a plurality of clients, the system comprising:
   a server having a processor, the processor configured, for each client of the plurality of clients:
      to receive over a computer communication system a request for the application from the client, the application being an off-the-shelf application, wherein the off-the-shelf application is a single-tenant application; and
      responsive to receipt of the request for the application:
         automatically to create an application instance of the application in response to the request, the application instance being a separate, stand-alone installation of the application in a service provider computing environment accessible by the server, whereby the application instance is associated with the client, the application instance being different from and independent of the application instance associated with any other client of the plurality of clients;
         to provide the application instance for exclusive access, over the computer communication system, by at least one user associated with the client; and
         to provide the client with access to online management functions to modify and manage the application instance of the client on demand,
      wherein the application instance associated with each client is a separate, stand-alone instance of the application dedicated to the client, thereby creating a virtual multi-tenant version of the application.

2. The system of claim 1, wherein each separate, stand-alone instance of the application dedicated to each client is separately stored in the service provider computing environment.

3. The system of claim 1, wherein, for each client of the plurality of clients, the processor provides the application instance by installing the application instance.

4. The system of claim 1, wherein, for each client of the plurality of clients, the application instance associated with the client comprises security features that make the application instance accessible only by the client and the at least one user associated with the client.

5. The system of claim 1, wherein, for each client of the plurality of clients, access to the application instance is provided by a unique application Universal Resource Identifier (URI) assigned to the client, the application URI being different from the application URI assigned to any other client of the plurality of clients, and access to the online management functions is provided by a provisioning and management URI different from the application URI.

6. The system of claim 1, wherein the online management functions include the ability for at least one client of the plurality of clients to save and restore a backup copy of the application instance of the client to a local storage device to allow reconstruction of the application instance of the client.

7. The system of claim 1, wherein the online management functions include the ability for at least one client of the plurality of clients to set and change client configuration data relating to the application instance of the client.

8. The system of claim 1, wherein the online management functions include the ability for at least one client of the plurality of clients to upgrade the application instance of the client to a newer code version, or downgrade the application instance of the client to a previous code version.

9. The system of claim 1, wherein, for at least one client of the plurality of clients, the at least one user associated with the client comprises a plurality of end users.

10. The system of claim 1, wherein, for each application instance, the at least one user operates in a client computing environment different from the service provider computing environment, wherein the client computing environment interfaces the service provider computing environment remotely via the computer communication system.

11. The system of claim 10, wherein the computer communication system comprises the Internet.

12. A computer-implemented method for on-demand provisioning of an application to a plurality of clients, the method comprising, for each client of the plurality of clients:
   receiving a request for the application from the client over a computer communication system, the application being an off-the-shelf application, wherein the off-the-shelf application is a single-tenant application; and
   responsive to receiving the request for the application:
      automatically creating an application instance of the application in response to the request, the application instance being a separate, stand-alone installation of the application in a service provider computing environment accessible by the server, whereby the application instance is associated with the client, the application instance being different from and independent of the application instance associated with any other client of the plurality of clients;
      providing the application instance for exclusive access, over the computer communication system, by at least one user associated with the client; and
      providing the client with access to online management functions to modify and manage the application instance of the client on demand,
   wherein the application instance associated with each client is a separate, stand-alone instance of the application dedicated to the client, thereby creating a virtual multi-tenant version of the application.

13. The method of claim 12, wherein each separate, stand-alone instance of the application dedicated to each client is separately stored in the service provider computing environment.

14. The method of claim 12, wherein, for each client of the plurality of clients, providing the application instance comprises installing the application instance.

15. The method of claim 12, wherein, for each client of the plurality of clients, the application instance associated with the client comprises security features that make the application instance accessible only by the client and the at least one user associated with the client.

16. The method of claim 12, wherein, for each client of the plurality of clients, access to the application instance of the client is provided by a unique application Universal Resource Identifier (URI) assigned to the client, the application URI being different from the application URI assigned to any other client of the plurality of clients, and access to the online management functions is provided by a provisioning and management URI different from the application URI.

17. The method of claim 12, wherein the online management functions include the ability for at least one client of the plurality of clients to save and restore a backup copy of the application instance of the client to a local storage device to allow reconstruction of the application instance of the client.

18. The method of claim 12, wherein the provisioning and management functions include the ability for at least one client of the plurality of clients to set and change client configuration data relating to the application instance of the client.

19. The method of claim 12, wherein the online management functions include the ability for at least one client of the plurality of clients to upgrade the application instance of the client to a newer code version, or downgrade the application instance of the client to a previous code version.

20. The method of claim 12, wherein, for at least one client of the plurality of clients, the at least one user associated with the client comprises a plurality of end users.

21. The method of claim 12, wherein, for each application instance, the at least one user operates in a client computing environment different from the service provider computing environment, wherein the client computing environment interfaces the service provider computing environment remotely via the computer communication system.

22. The method of claim 21, wherein the computer communication system comprises the Internet.

\* \* \* \* \*